United States Patent
Lee (10) Patent No.: US 10,375,293 B2
(45) Date of Patent: Aug. 6, 2019

(54) PHASE DISPARITY ENGINE WITH LOW-POWER MODE

(71) Applicant: QUALCOMM Incorporated, San Diego, CA (US)

(72) Inventor: Jisoo Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 15/692,350

(22) Filed: Aug. 31, 2017

(65) Prior Publication Data

US 2019/0068868 A1   Feb. 28, 2019

(51) Int. Cl.
| | |
|---|---|
| H04N 5/232 | (2006.01) |
| H04N 5/14 | (2006.01) |
| H04N 5/369 | (2011.01) |
| H04N 9/04 | (2006.01) |

(52) U.S. Cl.
CPC ......... *H04N 5/23212* (2013.01); *H04N 5/144* (2013.01); *H04N 5/23241* (2013.01); *H04N 5/23245* (2013.01); *H04N 5/23258* (2013.01); *H04N 5/23261* (2013.01); *H04N 5/232122* (2018.08); *H04N 5/232411* (2018.08); *H04N 5/36961* (2018.08); *H04N 9/045* (2013.01)

(58) Field of Classification Search
None
See application file for complete search history.

(56) References Cited

U.S. PATENT DOCUMENTS

| | | | |
|---|---|---|---|
| 6,818,875 B1 * | 11/2004 | Suzuki | G02B 7/28 250/201.2 |
| 8,274,596 B2 | 9/2012 | Pincenti et al. | |
| 2005/0275742 A1 | 12/2005 | Baron | |
| 2010/0225779 A1 | 9/2010 | Muukki et al. | |
| 2013/0242120 A1 | 9/2013 | Venkatraman et al. | |
| 2014/0118587 A1 * | 5/2014 | Ikedo | H04N 5/23212 348/281 |
| 2015/0160535 A1 * | 6/2015 | Suzuki | H04N 5/23212 348/357 |
| 2016/0227114 A1 | 8/2016 | Gren et al. | |
| 2016/0241774 A1 * | 8/2016 | Mochizuki | H04N 5/23229 |
| 2016/0301852 A1 | 10/2016 | Krishnamurthy et al. | |
| 2017/0094210 A1 | 3/2017 | Galor et al. | |
| 2017/0118395 A1 | 4/2017 | Van et al. | |

OTHER PUBLICATIONS

Partial International Search Report—PCT/US2018/039133—ISA/EPO—dated Oct. 16, 2018.
International Search Report and Written Opinion—PCT/US2018/039133—ISA/EPO—dated Dec. 10, 2018.

* cited by examiner

*Primary Examiner* — Roberto Velez
*Assistant Examiner* — Quan Pham
(74) *Attorney, Agent, or Firm* — Duane Morris LLP (57) ABSTRACT

A method provides phase disparity data. First phase disparity data for a first image frame of a first scene is computed using a phase disparity engine of an image capture device. The method determines whether the image capture device is receiving light from a second scene that is different from the first scene and corresponds to a second image frame. The phase disparity engine discontinues computing of phase disparity data, in response to a determination that the second scene is not different from the first scene. The first phase disparity data are output in connection with the second image frame, in response to determining that the second scene is not different from the first scene.

26 Claims, 8 Drawing Sheets

PHASE DISPARITY ENGINE WITH LOW-POWER MODE

CROSS-REFERENCE TO RELATED APPLICATIONS

None.

STATEMENT REGARDING FEDERALLY SPONSORED RESEARCH OR DEVELOPMENT

None

BACKGROUND

Field

This disclosure relates generally to image capture devices and more specifically to automatic controls for image capture devices.

Description of Related Art

Many image capture devices use phase detection autofocus (PDAF) techniques. PDAF systems can include sparse patterns of phase detection pixels distributed among imaging pixels in a color image sensor. The distributed pixels are provided in pairs, for example left-right pairs. Within each pair, the pixels are configured to capture light at different phase angles from each other. When light from a region of interest (ROI) is focused in the plane of the sensor, the phase disparity (PD) is zero. When light from the ROI is not focused in the plane of the sensor, the phase disparity is proportional to the distance the primary lens should be moved to bring the light from the ROI into focus at the plane of the sensor. PDAF can determine the optimal focus position for the primary lens based on PD measurements at a single lens position, making PDAF much faster than contrast autofocus methods.

Image sensors having two photodiodes per microlens—thus, two photodiodes per sensing element—are receiving increased interest. A sensor having two photodiodes per microlens can provide full resolution PD data, i.e., PD information from every imaging pixel. Processing full resolution PD data consumes more computational resources than processing sparse PD data.

SUMMARY

According to one aspect of this disclosure, a method for providing phase disparity data comprises: computing first phase disparity data for a first image frame of a first scene using a phase disparity engine of an image capture device; determining whether the image capture device is receiving light from a second scene that is different from the first scene and corresponds to a second image frame; discontinuing computing of phase disparity data by the phase disparity engine, in response to a determination that the second scene is not different from the first scene; and outputting the first phase disparity data in connection with the second image frame, in response to determining that the second scene is not different from the first scene.

According to another aspect, an image capture device comprises: an imaging sensor having a plurality of phase detection pixels and a phase disparity engine coupled to the sensor. The phase disparity engine includes at least one processor configured to: compute first phase disparity data for a first image frame of a first scene; determine whether the image capture device is receiving light from a second scene that is different from the first scene and corresponds to a second image frame; discontinue computing of phase disparity data, in response to a determination that the second scene is not different from the first scene; and output the first phase disparity data a second time for use in capturing the second image frame, in response to determining that the second scene is not different from the first scene.

According to one aspect, an image capture device comprises means for capturing data including phase disparity information. Means for computing a phase disparity data for an image frame of a scene are provided. Means are provided for determining whether the image capture device is receiving light from a second scene corresponding to a second image frame, and the second scene is different from a previously captured first scene corresponding to a first image frame. The means for computing phase disparity data is configured for discontinuing computing of phase disparity data, in response to a determination that the second scene is not different from the first scene. The means for outputting the phase disparity data is configured to output a first phase disparity data in connection with the first image frame and to output the first phase disparity data in connection with the second image frame, in response to determining that the second scene is not different from the first scene.

According to another aspect, a non-transitory, machine-readable storage medium is encoded with program code that is executable by a processor for providing phase disparity data. The program code comprises: program code for computing first phase disparity data for a first image frame of a first scene using a phase disparity engine of an image capture device; program code for determining whether the image capture device is receiving light from a second scene that is different from the first scene and corresponds to a second image frame; program code for discontinuing computing of phase disparity, in response to a determination that the second scene is not different from the first scene; and program code for outputting the first phase disparity data a second time for use in capturing the second image frame, in response to determining that the second scene is not different from the first scene.

DETAILED DESCRIPTION

This description of the exemplary embodiments is intended to be read in connection with the accompanying drawings, which are to be considered part of the entire written description.

As the number of autofocus points and corresponding regions of interest (ROI) of the imaging sensor increase, the number of phase disparity (PD) data computations also increases. A modern imaging sensor can have many focus points, and the PD engine of the camera computes PD data separately for every focus point.

Also, new pixel designs have increased PD computations. Sensors suitable for collecting full resolution PD data can provide more accurate phase detection autofocus (PDAF) operation. The increase in the number of phase detection pixels increases the processing load of PD computation each time the PD engine is invoked. Meanwhile, developers are producing an increasing number of new camera control components that can take advantage of PD data. For example, full resolution PD data can enable creation of depth maps using a single camera. Also, full resolution PD data can be used for adding a bokeh effect during image processing, to enhance the appearance of the unfocused portions of the image (which have a different depth from the focused ROI of the image).

The increase in the number of PD computations per invocation of the PD engine, and the increase in the number of applications invoking the PD engine can result in an increase in power consumption. A large fraction of image frames cover the same scene as the most recent previously captured frame. Thus, power consumption can be reduced by determining whether there has been a scene change, and bypassing the PD computation in response to a determination that there has not been a scene change. This disclosure provides an apparatus and methods for reducing power consumption, in spite of the increasing number of applications using PD data. Although the reduction in power consumption is greater for sensors capable of providing full resolution PD data, the techniques described below can also be used by image capture devices including sensors having sparse PD pixel configurations and sensors having partial mask PD pixels. The techniques described below can reduce power consumption for any type of PD pixel configuration.

Figure 1:
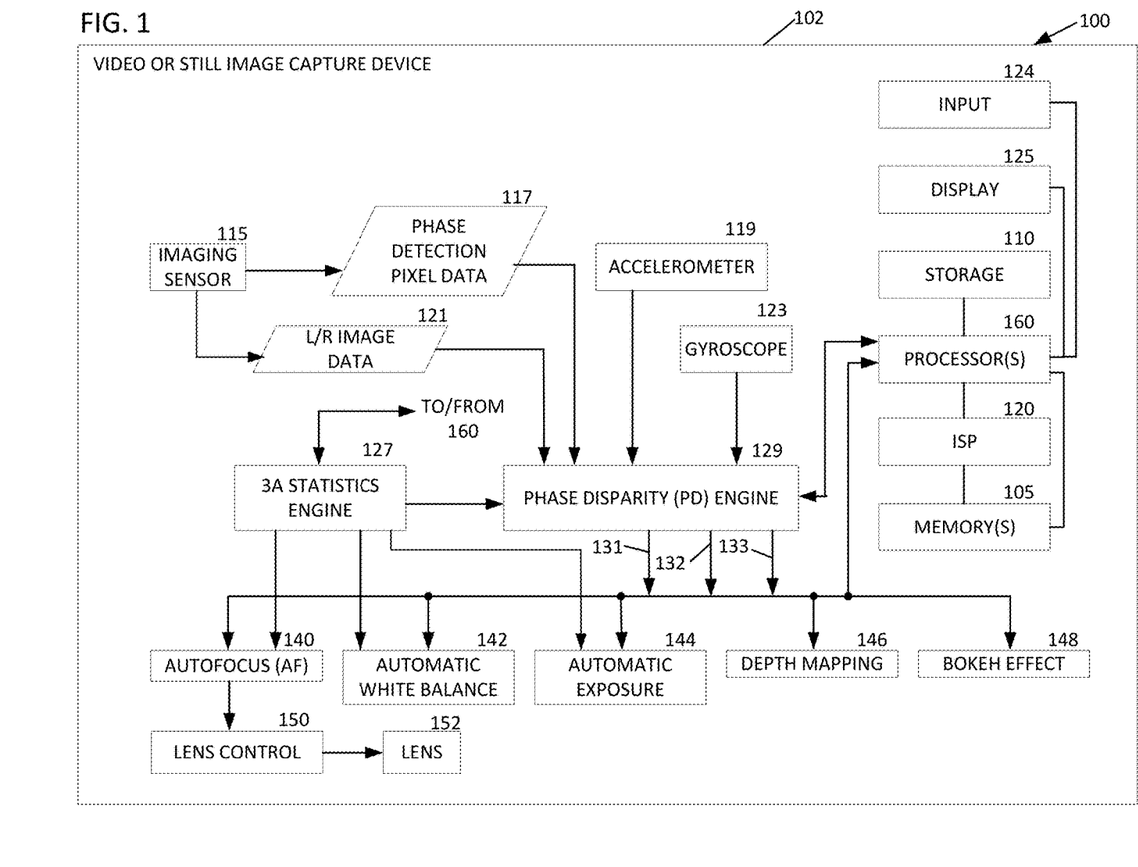
FIG. 1 is a schematic block diagram of an exemplary image capture device according to an embodiment of this disclosure.

FIG. 1 is a schematic block diagram of an exemplary image capture device 100. Image capture device 100 can be a phase detection autofocus (PDAF) camera having an imaging sensor 115. The image capture device 100 includes at least one processor 160, 120, 127, 129 linked to the imaging sensor 115 for capturing images. The processor 160 is also in communication with a memory 105, a non-transitory, machine readable storage medium 110 and an electronic display 125.

The image capture device 100 and phase disparity computation techniques described herein can provide advantages in many different types of portable and stationary computing devices. The image capture device 100 can be a special-purpose camera or a multi-purpose device capable of performing imaging and non-imaging applications. For example, image capture device 100 can be a portable personal computing device such as a mobile phone, digital camera, tablet computer, laptop computer, personal digital assistant, or the like.

The imaging sensor 115 can include a plurality of phase detection pixels for outputting phase disparity data (e.g., phase detection pixel data 117). In some embodiments, the phase detection pixels include at least two types of masked phase detection pixels discussed below in the description of FIGS. 2A-2B. The left and right phase detection pixels output left/right image data 121 (luminance data) that can be used to form under-sampled left and right images. In other embodiments, the imaging pixels include two photodiodes per microlens, and can also serve as phase detection pixels, discussed below in the description of FIG. 2C. The imaging sensor 115 can also have a lens control block 150 and a primary focusing mechanism including a lens 152. The lens 152 is positionable based at least partly on data received from the processor 160 to produce a focused image of a region of interest (ROI) in the target scene. Lens 152 can include any number of optical elements.

The at least one processor can include multiple processors, such as a general purpose processor 160, an image signal processor (ISP) 120, a 3A (autofocus, auto-white balance, and auto-exposure) statistics engine 127, and/or a phase disparity (PD) engine 129. In other embodiments, the processor 160 has a single central processing unit that performs image signal processing, 3A statistics, PD computation and other operations. Image signal processor (ISP) 120, 3A statistics engine 127 and PD engine 129 can include one or more dedicated processors or a software implementation programmed on a general purpose processor. In some examples, the image signal processor 120 performs phase detection functions of PD engine 129. Alternatively, the imaging sensor 115 can be configured to perform one or more of the phase disparity operations. One or more of ISP 120, 3A statistics engine 127 or PD engine 129 may be implemented in application specific integrated circuits (ASIC) or in a programmable gate array (PGA).

The image signal processor 120 can control image capture functions, such as autofocus block 140, auto-white balance block 142, and auto-exposure block 144. Image signal processor 120 can be a general purpose processing unit or a processor specially designed for imaging applications. Image signal processor 120 can perform several image processing applications including demosaicing, noise reduction and cross-talk reduction. In some embodiments, the image signal processor 120 also performs post-processing functions, such as depth mapping block 146 and/or bokeh effect block 148. The depth mapping block 146 can perform triangulation using a left phase detection pixel and a right phase detection pixel to determine the respective distance between the sensor and each point in the field of view. The bokeh effect block 148 can add a bokeh effect to the out-of-focus portion of an image (which can produce circles at the locations of points of light in the out-of-focus portion of the image). Image signal processor 120 can also perform cropping, scaling (e.g., to a different resolution), image stitching, image format conversion, color interpolation, color processing, image filtering (e.g., spatial image filtering), lens artifact or defect correction, sharpening, or the like.

The one or more processors 120, 127, 129, and 160 are connected to a memory 105, which may include an instruction memory for storing instructions and a working memory. The memory 105 can include a variety of modules that configure the one or more processors 120, 127, 129, and 160 to perform various image processing and device management tasks, such as the operations of the 3A statistics engine 127 and the phase disparity engine 129. Memory 105 can also be used by the processors 120, 127, 129, and 160 to store a working set of instructions contained in the modules of memory 105. Alternatively, memory 105 can also be used by the processors 120, 127, 129, and 160 to store dynamic data created during the operation of image capture device 100. Memory 105 can include specialized memory components for particular types of operations or data. For example, in some embodiments, memory 105 includes an instruction memory (not shown) comprising flash memory, and a working memory (not shown) comprising dynamic random access memory (DRAM).

The memory 105 can include instructions that configure the processor 160 and lens control 150 to adjust the position of lens 152, and control exposure and white balance of image capture device 100, for example. Memory 105 can further include instructions that control the overall image capture blocks of the image capture device 100. For example, autofocus (AF) block 140 can calculate movements of lens 152 or imaging sensor 115 to achieve a desired autofocus position, and command lens control 150 to output a lens control signal to the lens 152. The auto-white-balance (AWB) block 142 can determine the color temperature of the light source in order to decide which filter to apply to remove color casts from the incoming image data. The auto-exposure block 144 can determine an exposure time that will set the average brightness of the region of interest (ROI) used for light metering to a middle gray (i.e., the tone of an 18% gray card).

PD engine 129 provides a means for computing phase disparity data for an image frame of a scene. PD engine 129 stores instructions for computing phase disparity, as discussed in the description of FIGS. 2A-2C and FIG. 3 below. The PD engine 129 provides PD data for a variety of image capture and/or processing functions. For example, as shown in FIG. 1, PD engine 129 can provide PD data to the AF block 140, AWB block 142, AE block 144, depth mapping block 146 and/or bokeh effect block 148, for example. The PD data can be provided to other applications (not shown). The PD data can include an individual PD value 131 and confidence level 132 for a pair of PD pixels, and/or a PD map 133 of PD data for every PD pixel. If the imaging sensor 115 is capable of providing full density PD data, the PD map 133 can include respective PD data for each respective imaging pixel.

PD engine 129 is configured to "reuse" recent phase disparity data in response to a determination that the image capture device 100 has not moved and/or the scene has not changed since a previous image frame was captured. If there is no movement or scene change, PD engine 129 outputs recent PD data to other blocks that use the PD data, instead of computing and outputting new PD data. For example, the AWB block 142 can use first PD data for automatically computing a color temperature for a first image frame, and use the same first PD data again, for automatically computing a color temperature for the second image frame, in response to determining that the second scene is not different from the first scene. Also, the AE block 144 can use the first PD data for automatically computing an exposure time for the first image frame, and use the same first PD data for automatically computing an exposure time for the second image frame, in response to determining that the second scene is not different from the first scene.

If the image capture device 100 is a multi-purpose computing device (e.g., a laptop, cellular phone or tablet computer), the image capture device 100 has an operating system (not shown) such as the Windows operating system by Microsoft Corporation of Redmond, Wash. The operating system acts as an intermediary between programs and the at least one processor 120, 127, 129 and 160. The operating system can include device drivers to manage hardware resources such as the image capture device 100. Instructions contained in the image processing blocks discussed above interact with hardware resources indirectly, through standard subroutines or application program interfaces (APIs) in the operating system. Instructions within the operating system can then interact directly with these hardware components. The operating system can further configure the image signal processor 120 to share information with 3A statistics engine 127, PD engine 129 and ISP 120.

The processor 160 can be configured to control the display 125 to display the captured image or a preview of the captured image to a user. The display 125 can be external to the image capture device 100 or can be part of the image capture device 100. The display 125 can also be configured to provide a view finder displaying a preview image prior to capturing an image. The display 125 can comprise a liquid crystal display (LCD), light emitting diode (LED), or organic light emitting diode (OLED) screen, and can be touch sensitive and serve as an input device. The image capture device 100 can also include separate inputs 124, such as buttons, joy sticks, or the like.

The processors 120, 127, 129, 160 can write data to storage device 110. The data can include data representing captured images, data generated during phase detection and/or metadata, e.g., exchangeable image file format (EXIF) data. Storage device 110 can be configured as any type of non-transitory storage media device. For example, the storage device 110 can include a disk drive, such as a hard disk drive (HDD), an optical disk drive or magneto-optical disk drive, or a solid state memory such as FLASH memory, random access memory (RAM), read-only memory (ROM), and/or electrically-erasable programmable ROM (EEPROM). The storage device 110 can also include multiple memory units.

Although FIG. 1 shows an image capture device 100 ("image capture device") having separate components to implement a processor 160 and memory 105, in other examples these separate components can be combined in a variety of ways. For example, in an alternative example (not shown), the memory components can be combined with processor components in a system on a chip (SOC).

The image capture device 100 can have one or more motion sensors, which can include an accelerometer 119 and/or a gyroscope 123. The accelerometer 119 detects linear acceleration, which can be integrated to calculate linear velocity. The gyroscope 123 detects angular motion. If image capture device 100 is a multi-purpose computing device (e.g., laptop computer, phone, tablet or the like), the accelerometer 119 and/or a gyroscope 123 can be mounted inside the housing 102 of the image capture device. If image capture device 100 is a dedicated camera (e.g., DSLR), the accelerometer 119 and/or a gyroscope 123 can be positioned on the housing 102 or the lens 152.

Figure 2A:
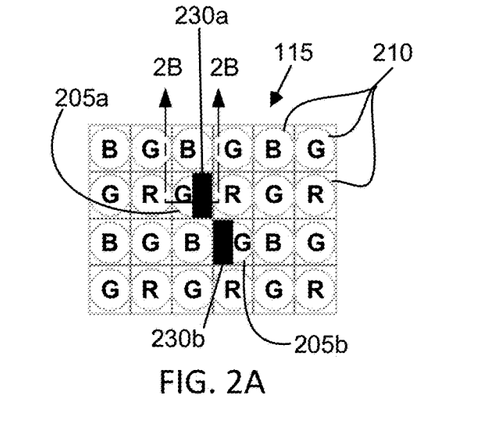
FIG. 2A is a schematic plan view of a sensor for the image capture device of FIG. 1, having partial mask type phase detection pixels.
Figure 2B:
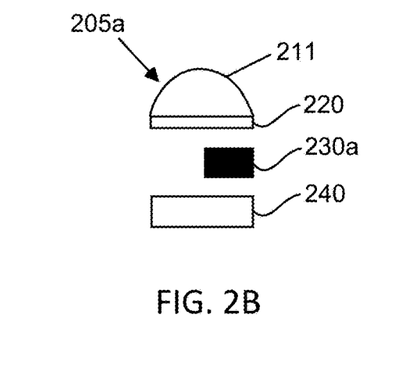
FIG. 2B is an exploded cross-sectional view taken along line 2B-2B of FIG. 2A.
Figure 2C:
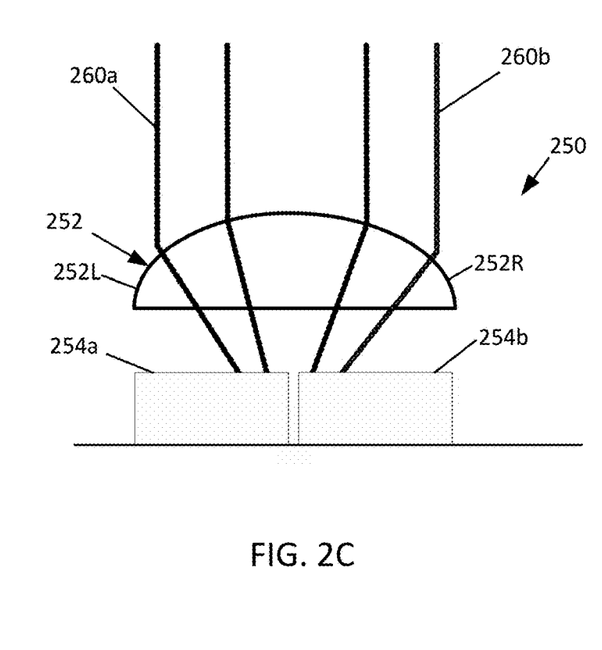
FIG. 2C is a schematic side view of a dual-photodiode type pixel for the sensor of FIG. 1.

FIGS. 2A-2C show examples of means for capturing data including phase disparity information. FIGS. 2A and 2B show an example of an imaging sensor 115 of FIG. 1 suitable for use in the image capture device 100 of FIG. 1. The imaging sensor 115 can be a complementary metal oxide semiconductor (CMOS) imaging sensor or a charge-coupled device (CCD) sensor. The imaging sensor 115 has a plurality of imaging pixels 210 and a plurality of phase detection pixels 205a, 205b. The imaging pixels 210 are arranged in a pattern according to their colors. The imaging pixels 210 can be red, green, and blue (R, G, and B, respectively, in FIG. 2A) type imaging pixels 210 arranged in a Bayer pattern. In other examples, the imaging pixels 210 can be arranged in a cyan, yellow, green, and magenta pattern, a red, green, blue, and emerald pattern, a cyan, magenta yellow, and white pattern, a red, green, blue, and white pattern or other suitable pattern corresponding to a demosaicing algorithm used to interpolate a set of red, green, and blue values for each imaging pixel 210.

FIG. 2A is a schematic view of the imaging sensor 115 in some embodiments. Although FIG. 2A shows an imaging sensor 115 with 24 sensing elements for ease of viewing, imaging sensor 115 can have several million sensing elements. FIG. 2B is an exploded view of a phase detection pixel 205a as viewed along section line 2B-2B of FIG. 2A. The PD pixel 205a has three components in common with the imaging pixels 210, including a microlens 211, a color filter 220, and a photodiode 240. The phase detection pixels 205a, 205b also include a partial mask 230a, 230b that prevents light passing through part of the microlens 211 from reaching the photodiode 240.

The imaging sensor 115 has two types of PD pixels 205a and 205b corresponding to partial masks 230a and 230b, respectively. The partial masks 230a and 230b are located on opposite sides of the phase detection pixels 205a and 205b, respectively. In some sensors 200 the partial mask 230a or 230b is located on the right side or the left side of each phase detection pixel 205a and 205b, as shown in FIG. 2A. A phase detection pixel 205a having a partial mask 230a on the right side is referred to as a "left phase detection pixel", because light entering the left portion of the "left phase detection pixel" 205a (to the left of the partial mask 230a) can reach the left side of the photodiode 240. Similarly, the phase detection pixel 205b having a partial mask 230b on the left side is referred to as a "right phase detection pixel" 205b, because light entering the right portion of the "right phase detection pixel" 205b (to the right of the partial mask 230b) can reach the right side of the photodiode 240. In other embodiments (not shown), a partial mask is provided on the top half of a "bottom phase detection pixel", and a partial mask is on the bottom half of a "top phase detection pixel".

FIG. 2C shows an alternative means for capturing data including phase disparity information. Pixel 250 is a type of pixel that can be used to provide full resolution phase disparity (PD) data. The pixel 250 has two photodiodes 254a, 254b per microlens 252. Light 260a entering the left side 252L of microlens 252 impinges on photodiode 254a. Light 260b entering the right side 252R of microlens 252 impinges on photodiode 254b. If the light 260a, 260b from the subject is in focus at the plane of the photodiodes 254a, 254b, the light impinging on the photodiodes 254a, 254b is centered at the midpoint between the photodiodes 254a, 254b. If the light 260a, 260b from the subject is out of focus at the plane of the photodiodes 254a, 254b, the light 260a impinges on the photodiode 254a, and the light 260b impinges on the photodiode 254b, with a distance between the respective points of peak light intensity of the light rays from each stream of incoming light 260a, 260b. The pixel 250 can provide PD data as well as image data. A sensor having an array of pixels 250 can provide full resolution PD data; i.e., every imaging pixel also is capable of providing PD data.

Figure 3:
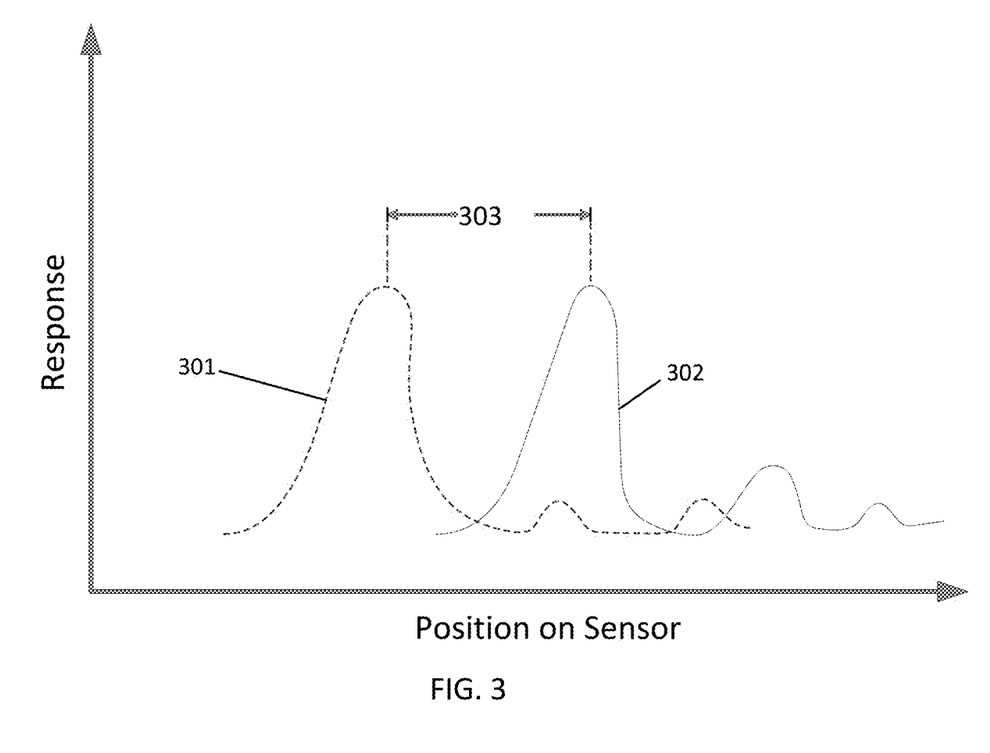
FIG. 3 is a diagram showing photodiode response for a pair of phase detection pixels receiving light from a region of interest that is focused in front of (or behind) the plane of the imaging sensor of FIG. 1.

FIG. 3 shows an exemplary response of the left and right PD pixels 205a, 205b (in FIG. 2A) or photodiodes 254a, 254b (in FIG. 2B) for an out-of-focus ROI. The light intensity distributions 301 and 302 are similar in shape due to the overlapping optical information sensed by the PD pixels 205a, 205b (in FIG. 2A) or photodiodes 254a, 254b (in FIG. 2B). The horizontal axis of FIG. 3 corresponds to position along the imaging sensor 115. The vertical axis of FIG. 3 corresponds to photodiode response (e.g., luminance measured). The distance 303 between the peaks of patterns 301, 302 represents the phase disparity.

Figure 4:
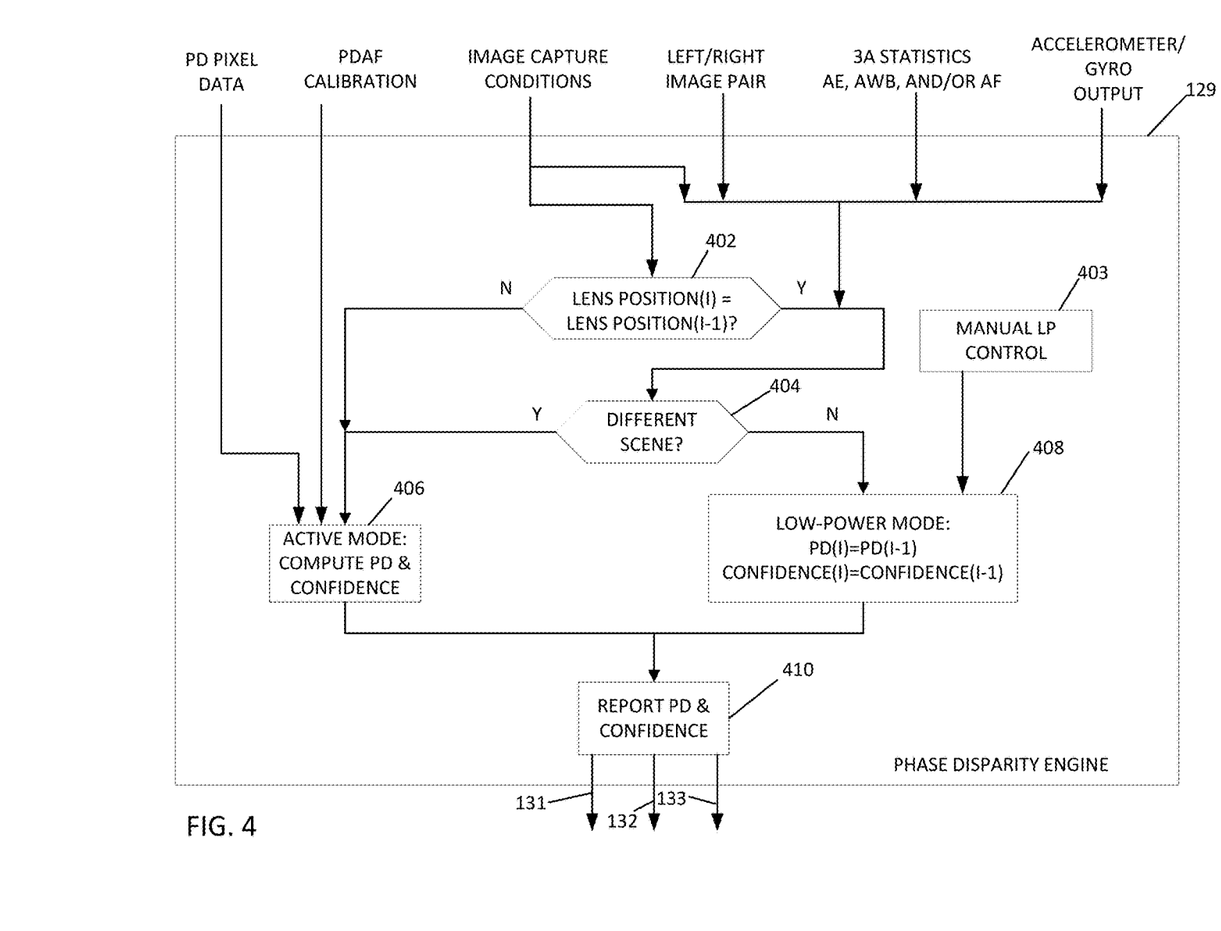
FIG. 4 is a block diagram of the phase disparity engine of FIG. 1.

FIG. 4 is a block diagram of the PD engine 129 of the image capture device 100 of FIG. 1. The phase disparity engine 129 is coupled to the imaging sensor 115. The PD engine 129 is configured to output a first phase disparity data in connection with the first image frame and to output the same first phase disparity data in connection with a second image frame, in response to determining that the second scene is not different from the first scene. The PD engine 129 is configured to resume computing of phase disparity data, in response to a determination that a current (first) position of a lens of the image capture device 100 is different from a (second) position of the lens when the second image frame is captured.

A lens position block 402 receives the image capture conditions, including the lens position of lens 152. (Other image capture conditions can include exposure time, white balance setting, F-stop, ISO speed, and exposure bias, for example.) The lens position block 402 determines whether the lens position of lens 152 of the image capture device 100 has moved between a first lens position during capture of a previous image frame and a second lens position for capture of a current image frame. The lens position block 402 activates an active mode processing block 406, if the lens position of the current image frame is different from the lens position of a previous image frame. If the lens position corresponding to the current image frame is equal to the lens position corresponding to the previous frame, lens position block 402 activates a scene change detection block 404.

The lens position block 402 provides a coarse filter, and uses minimal computations to detect situations for which new PD data should be generated. In most situations where the lens position has changed between image frames, the scene within the field of view has also changed. If the lens position block 402 determines that the lens position of the current frame is not the same as the lens position of the previous frame, then an autofocus operation is appropriate, and there is no need to perform scene change detection to determine whether to perform autofocus. Control passes directly to block 406 to return to active mode and resume PD computation. Thus, the PD engine 129 bypasses the more computationally intensive operations of the scene change detection block 404 and proceeds directly from lens position block 402 to active mode processing block 406.

In some embodiments, the lens position block 402 is configured to use the lens position of the most recent prior image frame as the "previous image frame" for determining whether the lens position of the current image frame is the same as the previous lens position. In alternative embodiments, the lens position block 402 is configured to use a reference lens position of a recent—but not most recent—prior image frame as the "previous image frame" for determining whether the lens position of the current image frame is the same as the previous lens position. For example, if the current image frame is frame No. 5, the lens position block 402 can be configured to determine whether the lens position corresponding to frame No. 5 is equal to the lens position corresponding to frame No. 1.

The scene change detection block 404 is configured to determine whether the image capture device 100 is receiving light from a second scene that is different from the first scene and corresponds to a second image frame. The scene change detection block 404 is coupled to receive left/right image data 121, 3A statistics from the 3A statistics engine 127, output signals from accelerometer 119 and/or output signals from gyroscope 123. The scene change detection block 404 provides a finer filter to detect situations in which the current scene is different from the previous scene, but lens position block 402 does not detect the scene change (because the lens position has not changed). The scene change detection block 404 performs one or more additional tests to evaluate whether the scene has changed, as described in the discussion of FIGS. 6 and 7. The scene change detection block 404 is configured to activate the active mode processing block 406 in response to detecting a scene change. The scene change detection block 404 is configured to activate the low power mode processing block 408 in response to determining that the scene of the current image frame is the same as the scene of the previous image frame (e.g., the scene has not changed). In some embodiments, the scene change detection block 404 is configured to activate the low power mode processing block 408 in response to determining that a respective focus value of two recently received image frames are different from each other. In other embodiments, the scene change detection block 404 is configured to activate the low power mode processing block 408 in response to determining that a respective color temperature of two recently received image frames are different from each other.

The active mode processing block 406 is configured to compute phase disparity while the phase disparity engine 129 operates in an active mode. The active mode processing block 406 is coupled to receive PD pixel data and PDAF calibration data. In the active mode, active mode processing block 406 computes PD data and a confidence level every time the PD engine 129 is invoked.

The confidence level indicates the likelihood that the focus value computed for the image is correct. The confidence level can be determined based on a spectral analysis of the image data corresponding to an edge, for example. Sharper edges have high contrast between adjacent pixels, and the spectral analysis shows that sharper edges have non-zero coefficients for higher order frequency components. The confidence level in an image as a function of focal length generally tracks the focus value as a function of focal length (lens position). The confidence level often has a peak at the focal length where the image is in focus, and falls off rapidly as the lens position moves away from the focused position. Low light levels or the presence of high-frequency patterns (e.g., closely spaced parallel lines) can reduce the confidence level for a focus value. When the image is severely out of focus, autofocus can select a lens position having a local maximum contrast value, so the confidence level is low. In most circumstances, with adequate lighting the confidence level has a peak value when the focus value is accurate. The confidence value can be based on a variety of statistical measures such as mean, variance, standard deviation or other measures. In one example, if statistical analysis reveals that selected lens positions for the near or far focus bound include lens positions situated at substantial distances from one another, the confidence value may be low.

For example, the active mode processing block 406 computes a first phase disparity data for a first image frame of a first scene. The phase disparity engine 129 is configured to operate at a first power consumption while computing the first phase disparity data. The first power consumption can be an average rate during the complete set of operations for computing the PD data.

The low power mode processing block 408 is configured to discontinue computing of phase disparity data, in response to a determination that the second scene is the same as the first scene. The low power mode processing block 408 is configured to set the PD value 131 for the current frame equal to the PD value of the previous frame, and set the confidence level 132 for the current frame equal to the confidence level of the previous frame. If the PD engine 129 is configured to output a PD map 133, the current values of the PD map data are set to the values of the PD map data of the previous frame. The PD computation logic of active mode processing block 406 is bypassed. The PD computation logic consumes a large amount of the total power consumed by the PD engine 129. Thus, the PD engine 129 operates at a second power consumption lower than the first power consumption while computing of phase disparity is discontinued.

In some embodiments, a manual low-power (LP) control 403 is provided. The manual low-power (LP) control allows the user to manually activate the low power mode processing block 408 by issuing a user-triggered command to PD engine 129. The phase disparity engine 129 discontinues computing of phase disparity in response to receiving the user-triggered command. In some embodiments, upon manual activation, the PD engine 129 stays in the LP mode until lens movement or scene change is detected. In alternative embodiments, manual low-power (LP) control 403 starts a countdown timer; the PD engine 129 stays in the LP mode at least until the timer reaches zero. In some embodiments, after the countdown timer reaches zero, the PD engine 129 stays in the LP mode until lens movement or scene change is detected. In other embodiments, after the countdown timer reaches zero, the PD engine 129 returns to active mode at the end of the timer and resumes PD computation. Alternatively, the PD engine 129 can return to active mode after a user input (e.g., a user-triggered command) indicating that the PD engine 129 should return to active mode.

A reporting block 410 provides a means for outputting the phase disparity data. The reporting block 410 can output the PD value 131, confidence level 132, and/or output a PD map 133 for the imaging sensor 115. The reporting block 410 is coupled to active mode processing block 406 and low power mode processing block 408, and reports the output of the active mode processing block 406 or 408. For example, reporting block 410 can receive the first phase disparity data corresponding to the first image frame from active mode processing block 406 and output the first phase disparity data when the first image frame is captured. Reporting block 410 can receive the same first phase disparity data a second time from low power mode processing block 408 and output the same first phase disparity data a second time for use in capturing the second image frame, in response to PD engine 129 determining that the second scene is the same as the first scene.

Each time the PD engine 129 is invoked, the lens position block 402 and/or the scene change detection block 404 determines whether the previous PD data can be reused. Thus, the phase disparity engine is configured to resume computation and operate at the first power consumption in response to the lens position block 402 determining that a lens of the image capture device 100 has moved between capture of a previous image frame and capture of a current image frame or the scene change detection block 404 determining that the scene of the previous image frame and the scene of the current image frame are different and/or has changed.

The decision whether to reuse previous PD data is encapsulated inside the PD engine 129. The AF block 140, AWB block 142, AE block 144, depth mapping block 146 and bokeh effect block 148 of FIG. 1 receive the PD data in the same format and manner, regardless of whether the PD data is newly generated by the active mode processing block 406 or reused by the low power mode processing block 408.

Figure 5:
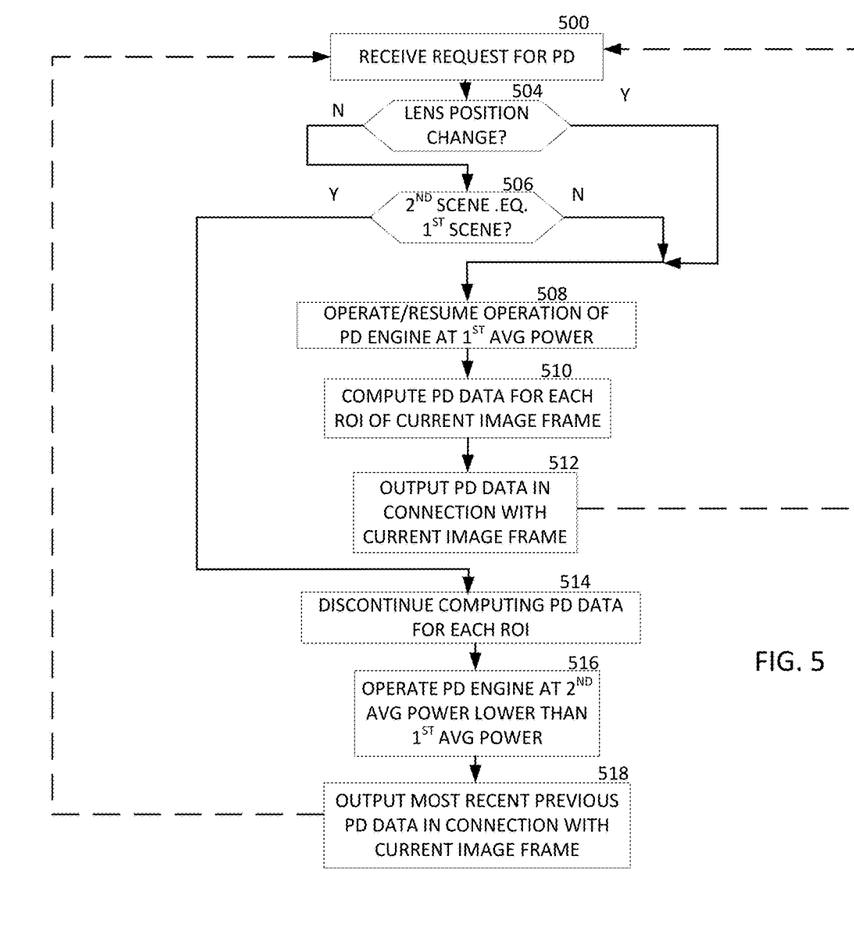
FIG. 5 is a flow chart showing operation of the phase disparity engine of FIG. 4.

FIG. 5 is a flow chart of an exemplary method of operating the PD engine 129.

In block 500, the PD engine 129 receives a request for PD data from AF block 140, AWB block 142, AE block 144, depth mapping block 146, bokeh effect block 148, or other application.

At block 504, PD engine 129 determines whether a lens position of the lens 152 has changed since a previous image frame was captured. In response to a determination that the lens position of the lens 152 has not changed, control passes to block 506. In response to a determination that the lens position of the lens 152 has changed, control passes to block 508.

At block 506, PD engine 129 determines whether a second scene of the image frame currently being captured is the same as, or different from, a first scene corresponding to a recently captured previous image frame. In response to a determination that the second scene is not the same as the first scene, control passes to block 508. In response to a determination that the second scene is the same as the first scene, control passes to block 514.

At block 508, the PD engine 129 is operated with a first power consumption corresponding to performing PD computations for every phase detection pixel, each time PD engine 129 is invoked. If the PD engine 129 is operating in the low power mode when block 508 is invoked, PD engine 129 resumes operating in the active mode at the first power consumption in response to detecting that the image capture device is panning.

At block 510, PD engine 129 computes a respective (first) PD data for each ROI of the current (first) image frame of a first scene. For example, if the image capture device has a grid of 20 ROIs with 20 respective focus points, PD data processing is performed 20 times, once for each ROI.

At block 512, PD engine 129 outputs the current (first) PD data in connection with the current (first) frame. In the image capture device having 20 ROIs, as discussed above, PD engine 129 outputs a grid or array including respective PD data for each respective ROI. The PD engine 129 then waits until one of the PD data using applications invokes PD engine 129 again.

At block 514, the PD engine 129 discontinues computing PD data in response to a determination that the second scene is the same as the first scene.

At block 516, the PD engine 129 is operated at a second power rate lower than the first power rate. The second power rate corresponds to PD engine 129 bypassing the computation of the PD data for the current frame.

At block 518, the reporting block 510 outputs the most recent previous PD data in connection with the current image frame. The PD engine then waits until one of the PD data using applications invokes PD engine 129 again. Thus, as long as the lens 152 does not move and the scene does not change, invocation of PD engine 129 results in reuse of the previous PD data.

The blocks 514, 516 and 518 bypass the PD computation corresponding to a region of interest (ROI) that is smaller than a field of view of the image capture device. In some embodiments, the image capture device 100 has a plurality of focus points and a respective ROI for each focus point. PD engine 129 computes a respective PD data for each respective ROI. Thus, when blocks 514, 516 and 518 bypass the PD computation, a respective computation is bypassed for each respective ROI, magnifying the reduction in power consumption.

Figure 6:
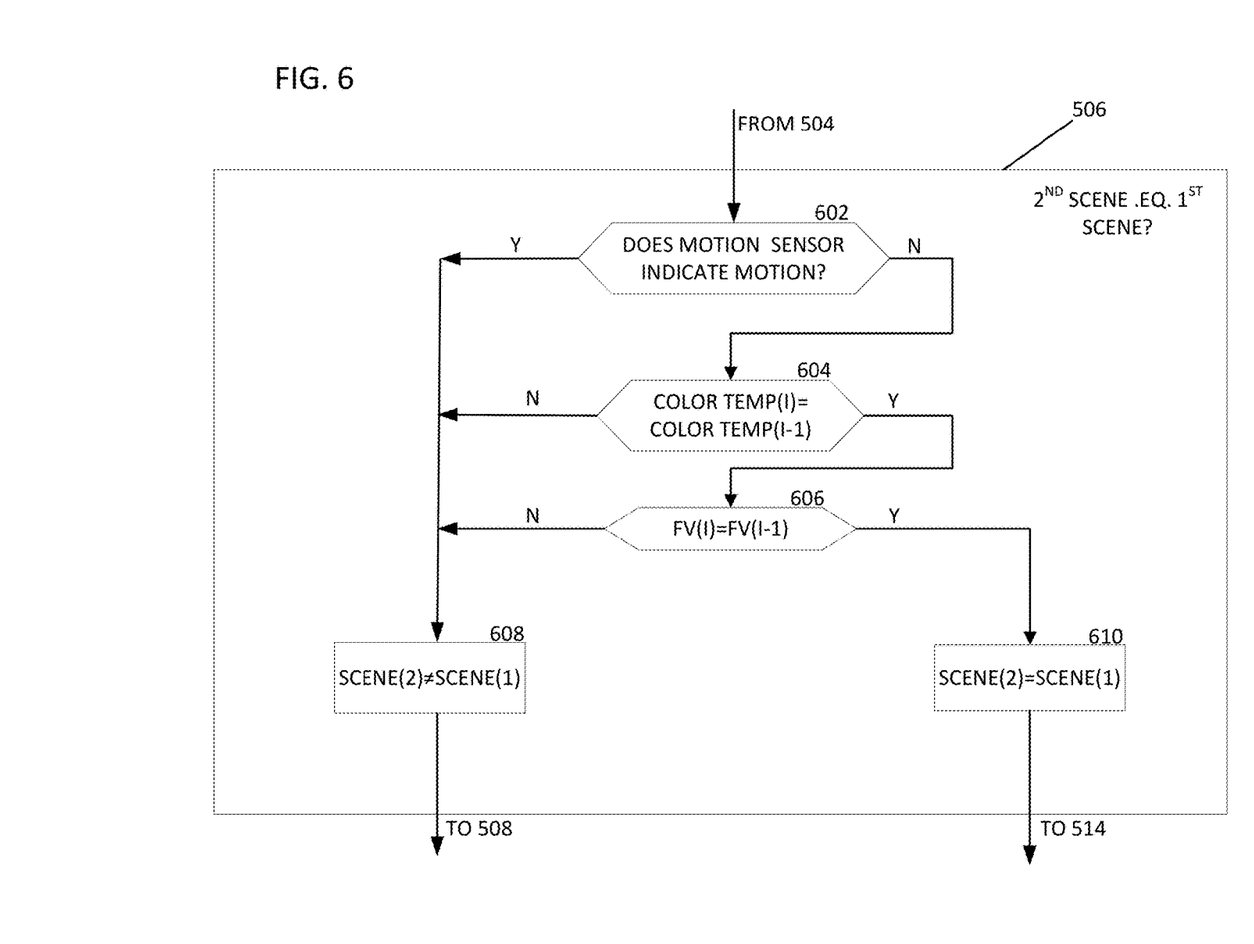
FIG. 6 is a flow chart for determining whether two scenes are the same.

FIG. 6 is a detailed flow chart showing a first example of an implementation of block 506 of FIG. 5. Block 506 provides a means for determining whether the image capture device 100 is receiving light from a second scene corresponding to a second image frame, and the second scene is different from a previously captured first scene corresponding to a first image frame.

At block 602, PD engine 129 receives signals from one or more motion sensors (e.g., accelerometer 119 and/or gyroscope 123 of FIG. 1) indicating the translational and/or rotational motion state of image capture device 100. For example, the accelerometer 119 can provide signals indicating translation. The gyroscope 123 can provide signals indicating rotation. Block 602 uses a conservative rule. If either motion sensor detects motion (e.g., translational, rotational, or any other type of motion), control is transferred to block 608. If neither motion sensor detects motion, control is transferred to block 604.

At block 604, PD engine 129 determines whether the color temperature of the current image frame (provided by the 3A statistics engine 127) equals (or is substantially equal to) the color temperature of the previous image frame. Block 604 can include a tolerance, so that color temperatures within a threshold value of each other (e.g., 10 degrees Kelvin to 20 degrees Kelvin) are substantially equal and are treated as though equal for purposes of detecting a scene change. 3A statistics engine 127 computes the color temperature based on color histogram data from the entire image frame, but the color temperature can be expressed as a single value, making color temperature an efficient indicator of a change between image frames. If the color temperatures of the current frame and previous frame are not the same, control is transferred to block 608. If the color temperatures of the current frame and previous frame are the same, control is transferred to block 606.

At block 606, PD engine 129 determines whether the focus value of the current image frame (provided by the 3A statistics engine 127) equals (or is substantially equal to) the focus value of the previous image frame. Block 606 can include a tolerance, so that focus values within a threshold value of each other (e.g., a threshold from 10 to 20 on a scale of 0 to 1000) are substantially equal and are treated as though equal for purpose of detecting a scene change. 3A statistics engine 127 computes the focus value based on luminance data from the entire image frame, but the focus value can be expressed as a single value, making focus value an efficient indicator of a change in scene between image frames. If the focus values of the current frame and previous frame are not the same, control is transferred to block 608. If the focus value of the current frame and previous frame are the same, control is transferred to block 610.

In some embodiments, block 606 computes the focus value over all of the image data for the full field of view. In other embodiments, block 606 uses a focus value for a smaller number of pixels than the full image frame. For example, block 606 can use a focus value for an ROI smaller than the full image frame At block 608, block 506 determines that the current scene is not the same as the previous scene and control is transferred to block 508 of FIG. 5.

At block 610, block 506 determines that the current scene is the same as the previous scene and control is transferred to block 514 of FIG. 5.

Figure 7:
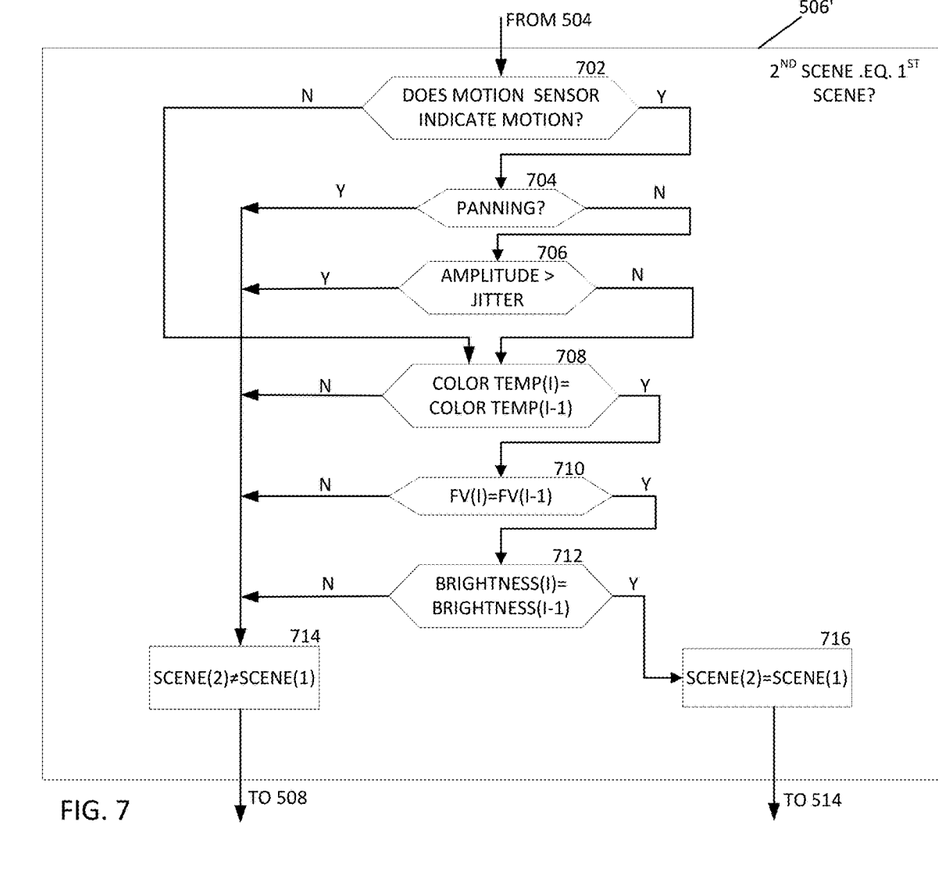
FIG. 7 is a flow chart of an alternative process flow for determining whether two scenes are the same.

FIG. 7 is a flow chart of an alternative decision block 506' for determining whether the second (current) scene is equal (or substantially equal) to the previous scene. Block 506' is another example of a means for determining whether the image capture device is receiving light from a second scene corresponding to a second image frame, and whether the second scene is different from a previously captured first scene corresponding to a first image frame.

At block 702, PD engine 129 receives signals from one or more motion sensors (e.g., accelerometer 119 and/or gyroscope 123) indicating the translational and/or rotational motion state of image capture device 100. Block 702 uses a less conservative rule than in the example of FIG. 6. If either motion sensor detects motion (e.g., translational, rotational, or any other type of motion), control is transferred to block 704 to determine what type of motion is detected before deciding whether a scene change is detected. If no motion is detected, control is transferred to block 708.

At block 704, PD engine 129 can use signals from accelerometer 119 and/or gyroscope 123 to determine whether the detected motion is panning motion. Panning motion is characterized by a slow, constant (or substantially constant) angular velocity. Panning motion corresponds to the longitudinal axis of the lens 152 following a subject, and often involves a changing background and/or changing distance between the imaging sensor 115 and the subject. In response to a determination that panning motion is present, control is transferred to block 714. In response to a determination that panning motion is not present, control is transferred to block 706.

At block 706, PD engine 129 can use signals from accelerometer 119 and/or gyroscope 123 to determine whether the detected motion is acceptable jitter or a significant motion. Jitter is characterized by a higher frequency translation and/or angular motion components. Jitter is likely to have a greater magnitude than digital noise but a smaller amplitude than panning or moving the image capture device 100 to photograph a different subject or pose. In response to a determination that jitter having an amplitude greater than a threshold value is present, control is transferred to block 714. In response to a determination that jitter is absent or below the threshold, control is transferred to block 708 in response to a determination that the motion is jitter. The PD engine 129 continues to output the first phase disparity data in response to a determination that the motion is jitter, unless a scene change is detected.

At block 708, PD engine 129 determines whether the color temperature of the current image frame (provided by the 3A statistics engine 127) equals (or is substantially equal to) the color temperature of the previous image frame. Block 708 can perform the same operation as block 604 of FIG. 6, and the description is not repeated. If the color temperatures of the current frame and previous frame are not the same, control is transferred to block 714. If the color temperatures of the current frame and previous frame are the same, control is transferred to block 710.

At block 710, PD engine 129 determines whether the focus value of the current image frame (provided by the 3A statistics engine 127) equals (or is substantially equal to) the focus value of the previous image frame. Block 710 can perform the same operation as block 606 of FIG. 6, and the description is not repeated. If the focus values of the current frame and previous frame are not the same, control is transferred to block 714. If the focus value of the current frame and previous frame are the same, control is transferred to block 712.

At block 712, PD engine 129 determines whether the brightness value of the current image frame (provided by the 3A statistics engine 127) equals (or is substantially equal to) the brightness value of the previous image frame. Block 712 can include a tolerance, so that brightness values within a threshold value of each other are substantially equal and are treated as though equal for purpose of detecting a scene change. 3A statistics engine 127 computes the brightness value based on luminance data from the entire image frame, but the brightness value can be expressed as a single value, making brightness value another efficient indicator of a change in scene between image frames. If the brightness values of the current frame and previous frame are not the same, control is transferred to block 714. If the brightness value of the current frame and previous frame are the same, control is transferred to block 716.

At block 714, block 506' determines that the current scene is not the same as the previous scene and control is transferred to block 508 of FIG. 5.

At block 716, block 506' determines that the current scene is the same as the previous scene and control is transferred to block 514 of FIG. 5.

Each of the examples of FIGS. 6 and 7 includes a block 606, 710 respectively that compares focus values computed for different frames to detect a scene change.

Figure 8:
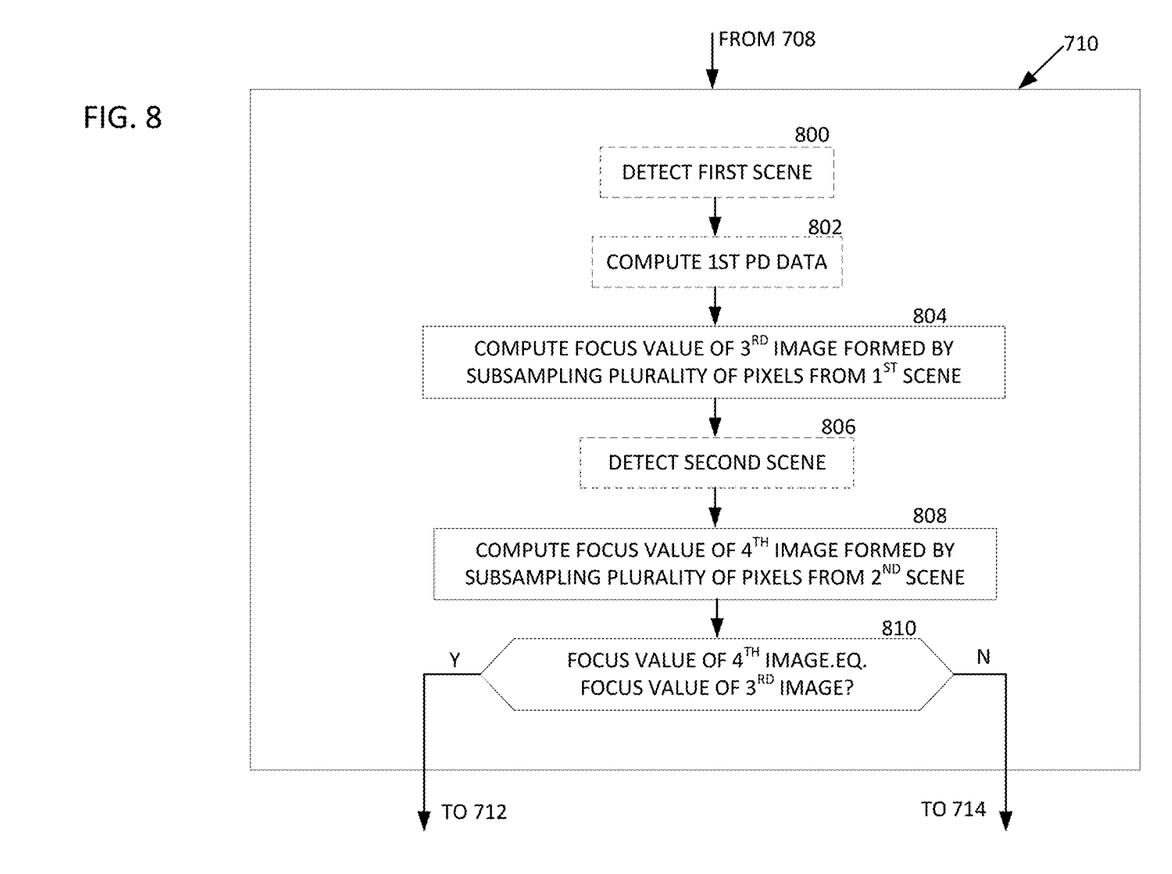
FIG. 8 is a flow chart of a process for determining whether the focus value of a second image frame is the same as the focus value of a first image frame.

FIG. 8 shows an example of an alternative implementation of block 710, which speeds up the focus value computation for the purpose of detecting a scene change. In FIG. 8 blocks 800, 802 and 806 are shown in phantom to indicate operations which are not part of block 710, for ease of understanding a sequence of related events.

In block 800, the first scene is detected.

In block 802, a first PD data is computed, corresponding to the first scene.

In block 804, the PD engine 129 computes a focus value of a third image formed by subsampling data from the plurality of pixels at a time of computing the first phase disparity data. For example, for purpose of detecting a scene change, the PD engine can subsample one of every 20 pixels in the image, and compute a focus value over the subsampled data.

In block 806, the second scene is detected.

In block 808, the PD engine 129 computes a focus value of a fourth image formed by subsampling data from the plurality of pixels at a time of detecting the second scene.

At block 810, the PD engine 129 compares the focus value of the fourth image to the focus value of the third image. If the focus value of the fourth image is the same as the focus value of the third image, block 810 transfers control to block 712 (which compares brightness of the scenes). If the focus value of the fourth image is not the same as the focus value of the third image, block 810 transfers control to block 714 of FIG. 7, because the second scene is different from the first scene.

FIG. 7 shows an example including several different criteria for determining whether the second scene is different from the first scene. Other examples can use sub-combinations of the criteria shown in FIG. 7. In one such example, determining whether the image capture device 100 is receiving light from a second scene that is different from the first scene includes comparing a brightness value and color temperature of the second image frame to a brightness value and color temperature of the first image frame, respectively. Thus, the sub-combination of blocks 708 and 712 provides an efficient tool for detecting a scene change.

The non-transitory machine-readable storage medium 110 of FIG. 1 can be encoded with program code that is executable by a processor for providing phase disparity data according to any of the methods described above. For example, the program code can include: program code for computing first phase disparity data for a first image frame of a first scene using a phase disparity engine of an image capture device; program code for outputting the first phase disparity data; program code for determining whether the image capture device is receiving light from a second scene that is different from the first scene and corresponds to a second image frame; program code for discontinuing computing of phase disparity, in response to a determination that the second scene is not different from the first scene; and program code for outputting the first phase disparity data a second time for use in capturing the second image frame, in response to determining that the second scene is not different from the first scene.

The methods and system described herein may be at least partially embodied in the form of computer-implemented processes and apparatus for practicing the processes. The disclosed methods may also be at least partially embodied in the form of tangible, non-transitory machine readable storage media encoded with computer program code. The media may include, for example, RAMS, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method for providing phase disparity data, comprising:
   computing first phase disparity data for a first image frame of a first scene using a phase disparity engine of an image capture device;
   determining that a second scene of a second image frame is equivalent to the first scene;
   discontinuing computing of phase disparity data by the phase disparity engine, in response to the determination that the second scene is equivalent to the first scene; and
   outputting the first phase disparity data in connection with the second image frame, in response to the determination that the second scene is equivalent to the first scene.

2. The method of claim 1, further comprising operating the image capture device with a first power consumption while computing the first phase disparity data, and operating the image capture device with a second power consumption lower than the first power consumption while computing of phase disparity is discontinued.

3. The method of claim 1, wherein a lens of the image capture device has a first position while the first phase disparity data is computed, further comprising:
   resuming computation by the phase disparity engine in response to detecting that the lens of the image capture device is in a second position different from the first position.

4. The method of claim 3, wherein determining that the second scene is equivalent to the first scene is performed in response to detecting that the lens of the image capture device is in the first position while computation by the phase disparity engine is discontinued.

5. The method of claim 1, further comprising:
   receiving signals from at least one motion sensor,
   determining whether the image capture device is panning based on the signals, and
   resuming computation by the phase disparity engine in response to detecting that the image capture device is panning.

6. The method of claim 1, further comprising computing a color temperature for the first image frame based on color histogram data, and computing a color temperature for the second image frame based on color histogram data, in response to the determination to determine that the second scene is equivalent to the first scene.

7. The method of claim 1, further comprising:
   receiving signals from at least one motion sensor coupled to a lens of the image capture device, and
   determining that the second scene is different from the first scene upon determining that the signals from the at least one motion sensor indicate that the lens of the image capture device is moving.

8. The method of claim 1 wherein:
   the image capture device has a sensor that includes a plurality of pixels, and
   the method further comprises:
      computing a focus value of a third image formed by subsampling data from the plurality of pixels at a time of computing the first phase disparity data;
      computing a focus value of a fourth image formed by subsampling data from the plurality of pixels at a time of detecting the second scene; and
      determining that the second scene is different from the first scene in response to determining that the focus value of the fourth image is different from the focus value of the third image.

9. The method of claim 1, further comprising discontinuing computing of phase disparity by the phase disparity engine, in response to receiving a user-triggered command.

10. The method of claim 1, wherein determining that the second scene is equivalent to the first scene includes:
    determining whether a respective focus value of the first and second image frames are equal to each other.

11. The method of claim 10, wherein determining that the second scene is equivalent to the first scene includes:
    determining whether a respective color temperature of the first and second image frames are equal to each other.

12. The method of claim 1, wherein:
    computing the first phase disparity data for the first image frame includes computing respective phase disparity data for each of a plurality of regions of interest (ROI) that are smaller than a field of view of the image capture device, and
    discontinuing computing of the phase disparity data includes discontinuing computing the phase disparity data for each respective ROI.

13. The method of claim 1, further comprising outputting the first phase disparity data in connection with the first image frame.

14. An image capture device, comprising:
an imaging sensor having a plurality of phase detection pixels; and
a phase disparity engine coupled to the sensor, the phase disparity engine including at least one processor configured to:
compute first phase disparity data for a first image frame of a first scene;
determine that a second scene of a second image frame is equivalent to the first scene;
discontinue computing of phase disparity data, in response to the determination that the second scene is equivalent to from the first scene; and
output the first phase disparity data in connection with the second image frame, in response to the determination that the second scene is equivalent to the first scene.

15. The image capture device of claim 14, wherein the phase disparity engine is configured to operate with a first power consumption while computing the first phase disparity data, and operate with a second power consumption lower than the first power consumption while computing of phase disparity is discontinued.

16. The image capture device of claim 14, wherein the phase disparity engine is configured to resume computation in response to detecting that a lens of the image capture device has moved between capture of a previous image frame and capture of a current image frame.

17. The image capture device of claim 14, further comprising an accelerometer or gyroscope, wherein the phase disparity engine is configured to:
receive signals from the accelerometer or gyroscope,
determine whether the image capture device is panning based on the signals, and
resume computation by the phase disparity engine in response to detecting that the image capture device is panning.

18. The image capture device of claim 14, further comprising an accelerometer or gyroscope, wherein the phase disparity engine is configured to:
receive signals from the accelerometer or gyroscope indicating a motion of the image capture device,
determine whether the motion is due to jitter, and
continue to output the first phase disparity data in response to a determination that the motion is jitter.

19. The image capture device of claim 14, wherein determining that the second scene is equivalent to the first scene includes determining whether a pair of respective focus values of the first and second image frames are equal to each other.

20. An image capture device, comprising:
means for capturing data including phase disparity information;
means for computing a phase disparity data for a first scene of a first image frame;
means for outputting the phase disparity data; and
means for determining that a second scene of a second image frame is equivalent to the first scene;
wherein the means for computing phase disparity data is configured for discontinuing computing of phase disparity data, in response to the determination that the second scene is equivalent to the first scene; and
wherein the means for outputting the phase disparity data is configured to output a first phase disparity data in connection with the first image frame and to output the first phase disparity data in connection with the second image frame, in response to the determination that the second scene is equivalent to the first scene.

21. The image capture device of claim 20, wherein the means for computing phase disparity data is configured to resume computing of phase disparity data, in response to a determination that a current position of a lens of the image capture device is different from a position of the lens when the second image frame is captured.

22. The image capture device of claim 20, wherein the means for determining that the second scene is equivalent to the first scene is configured to receive signals from a motion sensor indicating whether the image capture device is moving.

23. A non-transitory, machine-readable storage medium encoded with program code that is executable by a processor for providing phase disparity data, the program code comprising:
program code for computing first phase disparity data for a first image frame of a first scene using a phase disparity engine of an image capture device;
program code for determining that a second scene of a second image frame is equivalent to the first scene;
program code for discontinuing computing of phase disparity, in response to the determination that the second scene is equivalent to the first scene; and
program code for outputting the first phase disparity data in connection with the second image frame, in response to the determination that the second scene is equivalent to the first scene.

24. The non-transitory, machine-readable storage medium of claim 23, further comprising program code for resuming computation by the phase disparity engine in response to detecting that a lens of the image capture device is in a second position in connection with the second image frame, where the second position is different from a first position of the lens corresponding to the first image frame.

25. The non-transitory, machine-readable storage medium of claim 23, further comprising:
program code for receiving signals from at least one motion sensor,
program code for determining whether the image capture device is panning based on the signals, and
program code for resuming computation by the phase disparity engine and in response to detecting that the image capture device is panning.

26. The non-transitory, machine-readable storage medium of claim 23, wherein the program code for determining the second scene is equivalent to the first scene includes program code for comparing a brightness value and color temperature of the second image frame to a brightness value and color temperature of the first image frame, respectively.

* * * * *